US012803343B2

(12) United States Patent
Emoto

(10) Patent No.: US 12,803,343 B2
(45) Date of Patent: Nov. 17, 2026

(54) STATOR OF ROTARY ELECTRIC MACHINE AND MANUFACTURING METHOD OF STATOR OF ROTARY ELECTRIC MACHINE

(71) Applicant: HONDA MOTOR CO., LTD., Tokyo (JP)

(72) Inventor: Riku Emoto, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 164 days.

(21) Appl. No.: 18/908,874

(22) Filed: Oct. 8, 2024

(65) Prior Publication Data

US 2025/0211038 A1 Jun. 26, 2025

(30) Foreign Application Priority Data

Dec. 21, 2023 (JP) ................................ 2023-216039

(51) Int. Cl.

*H02K 1/16* (2006.01)
*H02K 1/20* (2006.01)

(Continued)

(52) U.S. Cl.

CPC ................. *H02K 1/16* (2013.01); *H02K 1/20* (2013.01); *H02K 3/345* (2013.01); *H02K 15/021* (2025.01); *H02K 15/062* (2013.01)

(58) Field of Classification Search

CPC .......... H02K 1/16; H02K 15/021; H02K 1/20; H02K 3/345; H02K 15/062

See application file for complete search history.

(56) References Cited

U.S. PATENT DOCUMENTS 8,212,449 B2 * 7/2012 Kouda ..................... H02K 3/48 174/120 SR
11,496,013 B2 * 11/2022 Koga ....................... H02K 3/30

(Continued)

FOREIGN PATENT DOCUMENTS

CN 107408864 A * 11/2017 .............. C09J 11/00
CN 115085408 A * 9/2022 ............... H02K 1/02

(Continued)

OTHER PUBLICATIONS

Machine Translation of CN 115085408 A (Year: 2022).*

(Continued)

*Primary Examiner* — Alexander A Singh
*Assistant Examiner* — Charlie Frank Mann, Jr.
(74) *Attorney, Agent, or Firm* — Amin, Turocy & Watson, LLP

(57) ABSTRACT

A stator includes: a stator core having an annular shape, a coil, and a cover member having a cylindrical shape. The stator core includes a plurality of teeth portions that are aligned in a circumferential direction and a plurality of slots that are formed between the teeth portions which are adjacent to each other in the circumferential direction. In the coil, a plurality of conductor wire portions are wound around each of the teeth portions through the slots. The cover member is arranged to be inserted into an inner circumferential portion of the stator core such that an outer circumferential surface faces an opening on an inside in a radial (Continued)

direction of the plurality of slots. A foamable insulation member that covers an outer surface of the plurality of the conductor wire portions of the coil and is bonded to the outer circumferential surface of the cover member through the opening of the slots is loaded in each of the slots.

3 Claims, 4 Drawing Sheets

(51) Int. Cl.

| | |
|---|---|
| ***H02K 3/34*** | (2006.01) |
| ***H02K 15/021*** | (2025.01) |
| ***H02K 15/062*** | (2025.01) |

(56) References Cited

U.S. PATENT DOCUMENTS

2014/0292118 A1* 10/2014 Takahashi ................ H02K 3/24 29/596
2014/0319951 A1 10/2014 Xie et al.
2018/0109156 A1 4/2018 Yamaguchi
2020/0235627 A1 7/2020 Matsumoto et al.
2025/0088076 A1* 3/2025 Martinez-Iturralde Maiza ........... H02K 3/34

FOREIGN PATENT DOCUMENTS

DE 102021122130 3/2023
DE 102021122130 A1 * 3/2023 ............. H02K 3/487
JP 2006-191788 7/2006
JP 2013-532939 8/2013
JP 2014-197962 10/2014
JP 2018-064419 4/2018
JP 2018064419 A * 4/2018 ............... H02K 3/18
JP 2020-120470 8/2020
WO 2023/012381 2/2023

OTHER PUBLICATIONS

Machine Translation of JP 2018064419 A (Year: 2018).*
Machine Translation of CN 107408864 A (Year: 2017).*
Machine Translation of DE 102021122130 A1 (Year: 2023).*
Japanese Office Action for Japanese Patent Application No. 2023-216039 dated Jul. 29, 2025.

* cited by examiner

STATOR OF ROTARY ELECTRIC MACHINE AND MANUFACTURING METHOD OF STATOR OF ROTARY ELECTRIC MACHINE

CROSS-REFERENCE TO RELATED APPLICATION

Priority is claimed on Japanese Patent Application No. 2023-216039, filed on Dec. 21, 2023, the contents of which are incorporated herein by reference.

BACKGROUND

Field of the Invention

The present invention relates to a stator of a rotary electric machine and a manufacturing method of a stator of a rotary electric machine.

Background

A rotary electric machine such as an electric motor or an electricity generator includes a stator and a rotor that rotates relative to the stator. The stator includes a stator core and a coil that is wound around the stator core. In the stator core, for example, a back yoke (yoke) having a cylindrical shape and a plurality of teeth portions that protrude inward in a radial direction from the back yoke are integrally formed. A slot is formed between the teeth portions that are adjacent to each other in a circumferential direction such that the slot opens inward in the radial direction. A plurality of conductor wire portions of the coil are inserted into each slot.

Further, as the stator of such a rotary electric machine, a stator has been devised in which a cover member (sleeve) having a cylindrical shape is arranged to be inserted in an inner circumferential portion of a stator core having an annular shape, and an opening of each slot is covered from an inside in the radial direction by an outer circumferential surface of the cover member (for example, refer to Japanese Unexamined Patent Application, First Publication No. 2006-191788).

In the stator described in Japanese Unexamined Patent Application, First Publication No. 2006-191788, an engagement hole is formed at a plurality of locations of the cover member having a cylindrical shape, and a lock protrusion portion that is fitted to the engagement hole of the cover member is formed on an inner circumferential surface of the stator core. The engagement hole is fitted to a corresponding lock protrusion portion of the stator core, and thereby, the cover member is fixed to the inner circumferential surface of the stator core.

SUMMARY

In the stator described in Japanese Unexamined Patent Application, First Publication No. 2006-191788, in order to fix the cover member having a cylindrical shape to the inner circumferential surface of the stator core, it is necessary to form a plurality of engagement holes on the cover member and to form a lock protrusion portion on the inner circumferential surface of the stator core. Therefore, in the case of the stator described in Japanese Unexamined Patent Application, First Publication No. 2006-191788, it is necessary to apply a complicated process on the cover member and the stator core, and there is room for improvement from the viewpoint of a production efficiency.

An aspect of the present invention aims at providing a stator of a rotary electric machine and a manufacturing method of the stator of the rotary electric machine that are capable of easily fixing a cover member having a cylindrical shape to an inner circumferential portion of a stator core without requiring a complicated process.

A rotary electric machine stator according to an aspect of the present invention includes: a stator core having an annular shape and including a plurality of teeth portions that are aligned in a circumferential direction and a plurality of slots that are formed between the teeth portions which are adjacent to each other in the circumferential direction; a coil in which a plurality of conductor wire portions are wound around each of the teeth portions through the slots; and a cover member that has a cylindrical shape and is arranged to be inserted into an inner circumferential portion of the stator core such that an outer circumferential surface faces an opening on an inside in a radial direction of the plurality of slots, wherein a foamable insulation member that covers an outer surface of the plurality of the conductor wire portions of the coil and is bonded to the outer circumferential surface of the cover member through the opening is loaded in each of the slots.

According to the configuration described above, the foamable insulation member is bonded through the opening of the slot to the outer circumferential surface of the cover member having a cylindrical shape in each slot. As a result, the cover member is fixed to the foamable insulation member in each slot through the opening of the plurality of slots. Further, the conductor wire portions of the coil arranged and accommodated in each slot are electrically insulated by the foamable insulation member. When the present configuration is employed, it is not necessary to perform a complicated machining for fixing both the cover member and the stator core, and it is possible to easily fix the cover member having a cylindrical shape to the inner circumferential portion of the stator core.

A foamable adhesion bond may be arranged on an outer surface of the foamable insulation member.

In this case, only by covering the outer surface of the plurality of conductor wire portions of the coil by the foamable insulation member, inserting the conductor wire portions and the foamable insulation member into a corresponding slot, and causing the foamable adhesion bond to foam, the cover member can be easily and reliably fixed to the foamable insulation member in the plurality of slots by the foamable adhesion bond.

The plurality of slots may constitute a cooling liquid passage in which a cooling liquid flows from one end side in an axis direction of the stator core to another end side.

In this case, the cooling liquid flows in the slot, and thereby, the conductor wire portion of the coil that is arranged to be inserted in the slot is efficiently cooled by the cooling liquid. At this time, the outflow of the cooling liquid to the inside in the radial direction from the slot is blocked by the cover member having a cylindrical shape. Further, at this time, the opening of the slot is closed by the foamable insulation member, and a portion of an outer circumferential surface of the cover member on which the pressure of the cooling liquid acts is reinforced by the foamable insulation member. Therefore, it is possible to prevent deformation of the cover member without increasing the thickness of the entire cover member. Accordingly, when the present configuration is employed, it is possible to thin the thickness of the cover member, narrow a gap between the stator and the rotor, and enhance a magnetic performance of the rotary electric machine.

Further, a rotary electric machine stator manufacturing method according to another aspect of the present invention is a manufacturing method of a rotary electric machine stator that includes: a stator core having an annular shape and including a plurality of teeth portions that are aligned in a circumferential direction and a plurality of slots that are formed between the teeth portions which are adjacent to each other in the circumferential direction; a coil in which a plurality of conductor wire portions are wound around each of the teeth portions through the slots; and a cover member that has a cylindrical shape and is arranged to be inserted into an inner circumferential portion of the stator core such that an outer circumferential surface faces an opening on an inside in a radial direction of the plurality of slots, the rotary electric machine stator manufacturing method comprising: inserting, in a state where an outer surface of the plurality of conductor wire portions of the coil is covered by a foamable insulation member, the plurality of conductor wire portions together with the foamable insulation member into a slot among the plurality of slots; and then bonding the foamable insulation member to the outer circumferential surface of the cover member through the opening of the slot by causing the foamable insulation member to foam.

In this case, only by covering the outer surface of the plurality of conductor wire portions of the coil by the foamable insulation member, inserting the conductor wire portions and the foamable insulation member into a corresponding slot, and causing the foamable insulation member to foam, the cover member having a cylindrical shape can be bonded and fixed to the foamable insulation member in the plurality of slots through the opening of the slot.

The rotary electric machine stator manufacturing method described above may further include: arranging, on an inside in the radial direction of a conductor wire portion among the plurality of conductor wire portions that is arranged at an innermost side in the radial direction in the slot, a spacer member having a rod shape and extending substantially along the conductor wire portion; covering an outer surface of the plurality of conductor wire portions and the spacer member by the foamable insulation member; inserting the spacer member and the plurality of conductor wire portions together with the foamable insulation member into the slot; and then bonding the foamable insulation member to the outer circumferential surface of the cover member through the opening of the slot by causing the foamable insulation member to foam.

In this case, by covering the outer surface of the plurality of conductor wire portions of the coil and the spacer member by the foamable insulation member and causing the formable insulation member to foam in a corresponding slot in that state, it becomes possible to arrange the plurality of conductor wire portions at an appropriate position on an outside in the radial direction of the slot. Further, in this case, the pressure of the cooling liquid does not easily act on an end surface on the outside in the radial direction of a conductor wire portion at an outermost side in the radial direction in the slot. Therefore, the plurality of conductor wire portions are not easily pressed inward in the radial direction by the cooling liquid.

Further, when a portion of the foamable insulation member that is located at the inside in the radial direction of the slot foams, the inside (a side away from the opening of the slot) of the foamable insulation member is supported by the spacer member. Therefore, at the time of foaming of the foamable insulation member, part of the foamable insulation member is expanded and displaced toward the opening of the slot in a state where the inside is supported by the spacer member. Accordingly, when the present configuration is employed, part of the foamable insulation member passes through the opening of the slot and is reliably bonded to the cover member through the opening.

The rotary electric machine stator manufacturing method described above may include: extracting the spacer member from an inside of the foamable insulation member after bonding the foamable insulation member to the outer circumferential surface of the cover member through the opening of the slot by causing the foamable insulation member to foam.

In this case, by extracting the spacer member having a rod shape after causing the foamable insulation member to foam, it is possible to reduce the weight of the stator. Further, after extracting the spacer having a rod shape, a communication hole along the axis direction of the stator is formed on the inside of the foamable insulation member. By using the communication hole as a cooling liquid passage, it becomes possible to efficiently cool the conductor wire portion of the coil.

In the rotary electric machine stator according to the aspect of the present invention, the foamable insulation member that covers the outer surface of the plurality of the conductor wire portions of the coil and is bonded to the outer circumferential surface of the cover member through the opening of the slot is loaded in each of the slots of the stator core. Therefore, the cover member having a cylindrical shape is bonded through the opening of the slot to the foamable insulation member in the plurality of slots. Accordingly, when the stator according to the aspect of the present invention is employed, it is possible to easily fix the cover member having a cylindrical shape to the inner circumferential portion of the stator core without requiring a complicated process.

In the rotary electric machine stator manufacturing method according to the aspect of the present invention, after the plurality of conductor wire portions together with the foamable insulation member are inserted into the slot in a state where the outer surface of the plurality of conductor wire portions of the coil is covered by the foamable insulation member, the foamable insulation member is bonded to the outer circumferential surface of the cover member through the slot by causing the foamable insulation member to foam. Therefore, only by covering the outer surface of the plurality of conductor wire portions by the foamable insulation member, inserting the conductor wire portions and the foamable insulation member into a corresponding slot, and causing the foamable insulation member to foam, the cover member having a cylindrical shape can be bonded and fixed to the foamable insulation member in the plurality of slots through the opening of the slot. Accordingly, when the stator manufacturing method according to the aspect of the present invention is employed, it is possible to easily fix the cover member having a cylindrical shape to the inner circumferential portion of the stator core without requiring a complicated process.

DESCRIPTION OF EMBODIMENTS

Hereinafter, an embodiment of the present invention will be described with reference to the drawings.

Figure 1:
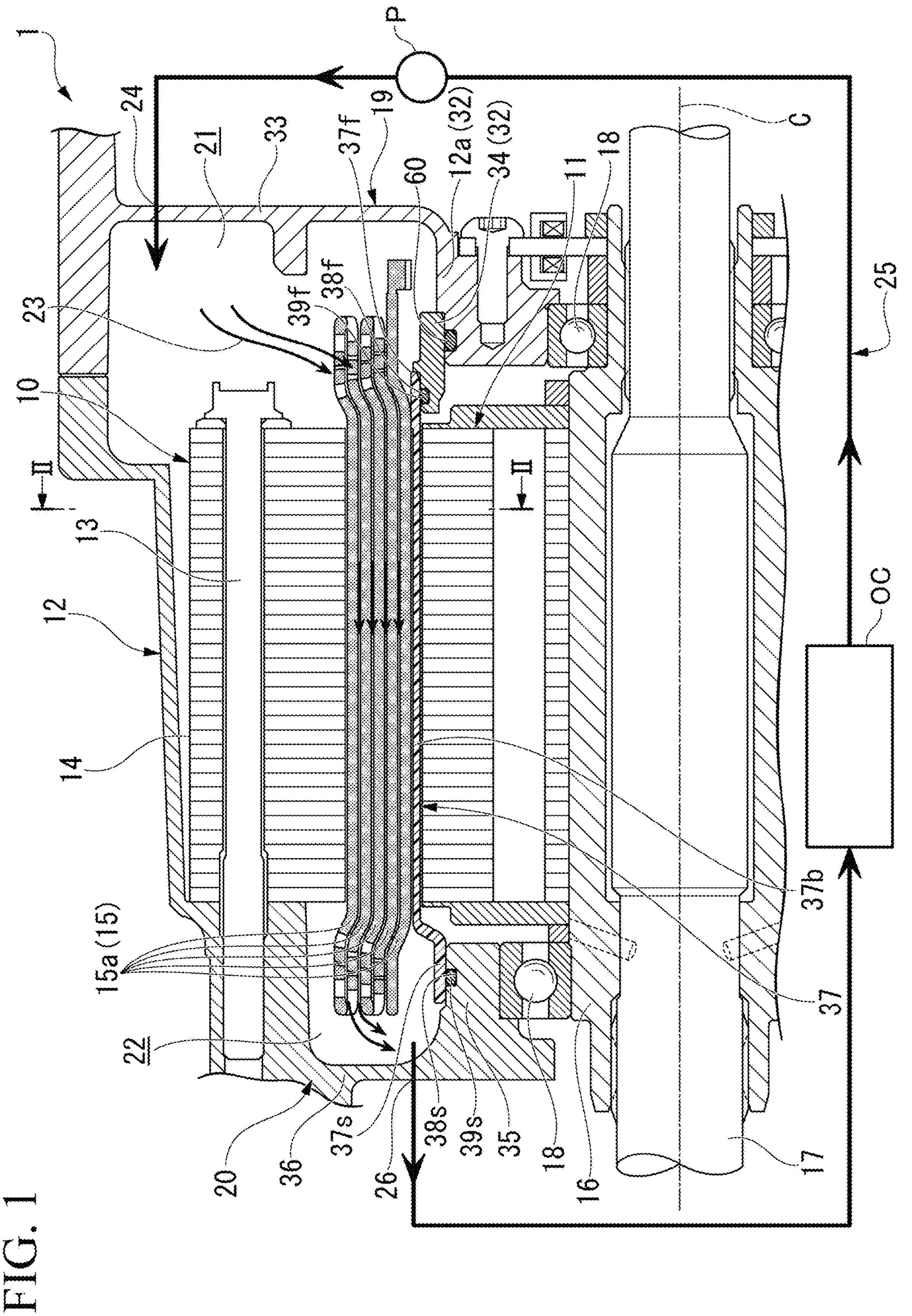
FIG. 1 is a longitudinal cross-sectional view of a rotary electric machine of an embodiment.

FIG. 1 is a longitudinal cross-sectional view of a rotary electric machine 1 of the present embodiment.

The rotary electric machine 1 of the present embodiment includes a stator 10 and a rotor 11. The stator 10 and the rotor 11 are accommodated in a rotary electric machine case 12. The stator 10 is fixed to an inside of the rotary electric machine case 12 by the fastening using a bolt 13 or the like. The stator 10 includes a stator core 14 having a cylindrical shape and a plurality of coils 15 that are wound around the stator core 14. The rotor 11 is rotatably arranged at an inside in a radial direction of the stator core 14 (stator 10).

A permanent magnet (not shown) is attached to the vicinity of an outer circumferential surface of the rotor 11. Further, the rotor 11 is rotatably supported integrally by a rotation shaft 17 via a sleeve 16. The rotation shaft 17 becomes an output shaft when the rotary electric machine 1 is used as a motor, and the rotation shaft 17 becomes a power input shaft when the rotary electric machine 1 is used as an electricity generator. The rotation shaft 17 and the sleeve 16 are rotatably supported by the rotary electric machine case 12 via a bearing 18.

In the following description, a direction parallel to a rotation axis line C of the rotor 11 is referred to as an axis direction, a rotation direction of the rotor 11 is referred to as a circumferential direction, and a radial direction of the rotor 11 that is orthogonal to the axis direction and the circumferential direction is referred to as a radial direction.

A first side case 19 and a second side case 20 that have an annular shape are arranged on one end side and another end side in the axis direction of the stator core 14. Main parts of the first side case 19 and the second side case 20 are formed of the rotary electric machine case 12.

The first side case 19 covers one end surface in the axis direction of the stator core 14 and an exposure portion of the coil 15 that protrudes from the one end surface from the outside. The first side case 19 forms a first liquid room 21 having an annular shape together with the one end surface in the axis direction of the stator core 14. An introduction port 24 for introducing a cooling liquid 23 into the first liquid room 21 is formed on the first side case 19. The introduction port 24 is connected to a circulation circuit 25 of the cooling liquid 23. The cooling liquid 23 that is introduced into the first liquid room 21 cools the exposure portion of the coil 15 that protrudes from the one end surface of the stator core 14, then passes through the inside of the stator core 14, and flows into another end side in the axis direction of the stator core 14.

The second side case 20 covers another end surface in the axis direction of the stator core 14 and an exposure portion of the coil 15 that protrudes from the other end surface from the outside. The second side case 20 forms a second liquid room 22 having an annular shape together with the other end surface in the axis direction of the stator core 14. The cooling liquid 23 that is introduced into the first liquid room 21 flows into the second liquid room 22 through the inside of the stator core 14. The cooling liquid 23 that is introduced into the second liquid room 22 cools the exposure portion of the coil 15 that protrudes from the other end surface of the stator core 14. A discharge port 26 for discharging the cooling liquid 23 in the second liquid room 22 to the outside is formed on the second side case 20. The discharge port 26 is connected to the circulation circuit 25 of the cooling liquid 23. The cooling liquid 23 that has cooled the coil 15 in the second liquid room 22 is caused to return to the circulation circuit 25 from the discharge port 26.

In the circulation circuit 25, a supply pump P is connected to a middle of the circuit. A heat exchanger OC that cools the cooling liquid 23 by a heat exchange with outside air is connected to an upstream side of the supply pump P in the circulation circuit 25. A downstream side of the supply pump P is connected to the introduction port 24. Further, an upstream side of the heat exchanger OC in the circulation circuit 25 is connected to the discharge port 26.

Figure 2:
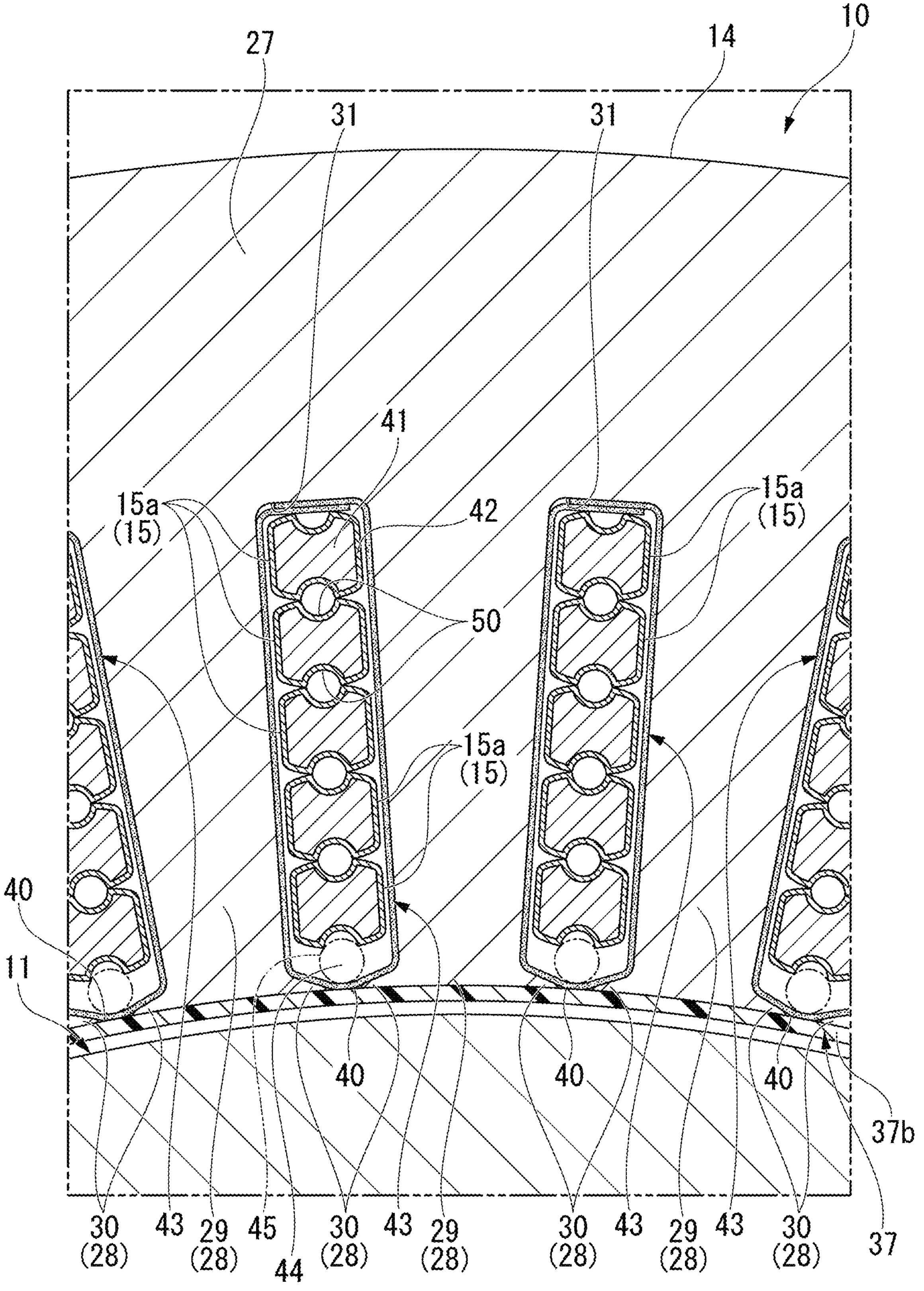
FIG. 2 is a cross-sectional view along a II-II line of FIG. 1 of the rotary electric machine of the embodiment.

FIG. 2 is a cross-sectional view along a II-II line of FIG. 1 of the rotary electric machine 1.

The stator core 14 is formed, for example, by laminating a plurality of electromagnetic steel plates in the axis direction. In the stator core 14, as shown in FIG. 2, a back yoke 27 having a cylindrical shape and a plurality of teeth portions 28 that protrude inward in the radial direction from an inner circumferential portion of the back yoke 27 are integrally molded. The back yoke 27 is formed such that a cylinder center is matched with the rotation axis line C.

The teeth portions 28 are arranged to be spaced apart from each other in the circumferential direction. The teeth portion 28 is formed in a T shape when seen from the axis direction. That is, in the teeth portion 28, a teeth main body 29 that protrudes inward in the radial direction from the inner circumferential portion of the back yoke 27 and a flange portion 30 that projects to both sides in the circumferential direction from an inner end in the radial direction in the teeth main body 29 are integrally molded.

A slot 31 in which an inner side in the radial direction is opened is formed between the teeth portions 28 that are adjacent to each other in the circumferential direction. The slot 31 is formed by being surrounded by side walls that face each other of the teeth portions 28 that are adjacent to each other and an inner circumferential wall of the back yoke 27. The side wall of each teeth portion 28 is formed of a side portion of the teeth main body 29 and a side section of the flange portion 30. A portion of the slot 31 that is formed of the side portions of the right and left teeth main bodies 29 has a substantially constant width. Further, a width of a portion of the slot 31 that is formed of the side sections of the right and left flange portions 30 is narrower than a width of the portion that is formed of the side portions of the right and left teeth main bodies 29.

An opening 40 on the inside in the radial direction of each slot 31 is formed by being sandwiched by front end sections of the right and left (both sides in the circumferential direction) flange portions 30 of the slot 31.

In the coil 15, for example, three phases which are a U-phase, a V-phase, and a W-phase are provided. The coil 15 is constituted, for example, by connecting a plurality of segment coils to each other. In a conductor wire portion 15*a* of the coil 15, an outer surface of a core wire 41 made of a metal is covered by an insulation film 42. The conductor wire portion 15*a* of the coil 15 is constituted of a rectangular wire. That is, a cross-sectional shape of each conductor wire portion 15*a* is formed in a substantially rectangular shape.

As shown in FIG. 2, a plurality of conductor wire portions 15*a* of the coil 15 that are inserted through the same slot 31 are aligned in a line along the radial direction. In the present embodiment, for example, five conductor wire portions 15*a* are inserted through the same slot 31. However, the number of the conductor wire portions 15*a* that are inserted through the same slot 31 is not limited to this and can be arbitrarily set.

In a state where the plurality of conductor wire portions 15*a* that are inserted and arranged in each slot 31 are bundled so as to be aligned in a line in parallel with each other, and the periphery of the plurality of conductor wire portions 15*a* is covered by a sheet of a foamable insulation member 43. For example, it is possible to employ a foamable insulation member 43 in which a foamable adhesion bond is arranged (applied) on a surface (a surface that faces outward in a state of wrapping the conductor wire portion 15*a*) of a base material sheet having an electrical insulation property, and a non-foamable adhesion bond is arranged (applied) on a rear surface of the base material sheet. The foamable insulation member 43 is inserted and arranged in a corresponding slot 31 together with the plurality of conductor wire portions 15*a* in a state of covering the periphery of the plurality of conductor wire portions 15*a*. Then, by performing a heating treatment or the like, the foamable insulation member 43 foams in the corresponding slot 31. The behavior or the like of the foamable insulation member 43 at the time of foaming will be described later in detail.

Even after the conductor wire portion 15*a* of the coil 15 and the foamable insulation member 43 are arranged in the slot 31 as described above, a gap for causing one end side in the axis direction of the stator core 14 to communicate with another end side is ensured at the inside of the slot 31. The gap constitutes a cooling liquid passage 44 for causing the cooling liquid that is introduced into the first liquid room 21 to flow to the second liquid room 22 side. The gap that constitutes the cooling liquid passage 44 is, specifically, a gap between an inner surface of the foamable insulation member 43 and the conductor wire portion 15*a*, a gap between the conductor wire portions 15*a* that are adjacent to each other, a gap between an outer surface of the foamable insulation member 43 and an inner wall of the slot 31, or the like. The cooling liquid 23 that flows through the cooling liquid passage 44 in the slot 31 absorbs heat of the conductor wire portion 15*a* of the coil 15.

A recess groove 50 that extends along the axis direction of the stator core 14 is formed on a surface that faces outward in the radial direction and a surface that faces inward in the radial direction of each conductor wire portion 15*a* which is arranged in each slot 31.

The recess groove 50 is formed to be recessed in a substantially arc shape toward a middle region in a width direction of the conductor wire portion 15*a*. When the plurality of conductor wire portions 15*a* are arranged together with the foamable insulation member 43 in the slot 31, the recess groove 50 forms a gap (cooling liquid passage 44) that extends substantially along the axis direction between end surfaces of the conductor wire portions 15*a* that are adjacent to each other in the radial direction and between an end surface of the conductor wire portion 15*a* and an inner surface of the foamable insulation member 43.

As shown in FIG. 1, the first side case 19 on one end side in the axis direction of the stator core 14 includes a first inner circumferential wall 32 that faces the first liquid room 21. The first inner circumferential wall 32 protrudes in a cylindrical shape from an inner end portion in the radial direction of an end side wall 33 of the first side case 19 located at an outer end in the axis direction of the first liquid room 21 toward one end surface in the axis direction of the rotor 11. In the case of the present embodiment, the first inner circumferential wall 32 is constituted of a circumferential wall main body portion 12*a* that is formed integrally with the rotary electric machine case 12 (end side wall 33) and a cylindrical member 34 as a separate body that is attached to an outer circumferential surface on an extension end side of the circumferential wall main body portion 12*a*. A space between the circumferential wall main body portion 12*a* and the cylindrical member 34 is sealed by a seal member 60 having an annular shape.

However, the entire first inner circumferential wall 32 may be formed integrally with the rotary electric machine case 12 (end side wall 33).

Further, the second side case 20 on another end side in the axis direction of the stator core 14 includes a second inner circumferential wall 35 that faces the second liquid room 22. The second inner circumferential wall 35 protrudes in a cylindrical shape from an inner end portion in the radial direction of an end side wall 36 of the second side case 20 located at an outer end in the axis direction of the second liquid room 22 toward another end surface in the axis direction of the rotor 11. In the case of the present embodiment, the second inner circumferential wall 35 is formed integrally with the rotary electric machine case 12 (end side wall 36).

However, the second inner circumferential wall 35 may be constituted of a circumferential wall main body portion that is integral with the rotary electric machine case 12 (end side wall 36) similarly to the first inner circumferential wall 32 and a cylindrical member as a separate body.

An annular partition wall 37 which is a cover member having a cylindrical shape is provided on an outer circumferential surface of the first inner circumferential wall 32 of the first side case 19 and an outer circumferential surface of the second inner circumferential wall 35 of the second side case 20. The annular partition wall 37 is formed of, for example, a resin material. However, the annular partition wall 37 can be also formed of another material such as a metal material. The annular partition wall 37 has a first end portion 37*f* that faces the inside of the first liquid room 21, a second end portion 37*s* that faces the inside of the second liquid room 22, and a partition wall main body portion 37*b* that is located between the first end portion 37*f* and the second end portion 37*s* and faces an inner circumferential surface of the stator core 14. The first end portion 37*f* is formed to have the same inner diameter as the partition wall main body portion 37*b*. The diameter of a middle portion in an extension direction of the second end portion 37*s* is reduced in a step manner with respect to the partition wall main body portion 37*b*.

An inner circumferential surface of the first end portion 37*f* is slidably fitted to an outer circumferential surface of the cylindrical member 34 of the first inner circumferential wall 32. An annular groove 38*f* is formed on the outer circumferential surface of the cylindrical member 34, and a seal member 39*f* having an annular shape such as an O-ring is attached to the annular groove 38*f*. A space between the cylindrical member 34 (first inner circumferential wall 32) and the first end portion 37*f* (annular partition wall 37) is sealed in a liquid-tight manner by the seal member 39*f*.

In the present embodiment, the first end portion 37*f* constitutes, at the inside of the first liquid room 21, a guide member that guides the cooling liquid in the first liquid room 21 to an opening of the slot 31 at one end side in the axis direction of the stator core 14.

An inner circumferential surface of a reduced diameter section of the second end portion 37*s* is slidably fitted to an outer circumferential surface of the second inner circumferential wall 35. An annular groove 38*s* is formed on the outer circumferential surface of the second inner circumferential wall 35, and a seal member 39*s* having an annular shape such as an O-ring is attached to the annular groove 38*s*. A space between the second inner circumferential wall 35 and the second end portion 37*s* (annular partition wall 37) is sealed in a liquid-tight manner by the seal member 39*f*.

In the annular partition wall 37, as described above, the first end portion 37*f* is fitted in a liquid-tight manner to the first inner circumferential wall 32 of the first side case 19, and the second end portion 37*s* is fitted in a liquid-tight manner to the second inner circumferential wall 35 of the second side case 20. The annular partition wall 37 separates an inner region in the radial direction of the stator core 14 attached to the inside of the rotary electric machine case 12 from the outer circumferential surface of the rotor 11. Therefore, even if the cooling liquid 23 leaks out from the slot 31 of the stator core 14 to the inner region in the radial direction, it is possible to prevent the cooling liquid 23 from flowing into the outer circumferential surface side of the rotor 11.

Further, an outer circumferential surface of the first end portion 37*f* of the annular partition wall 37 expands further outward in the radial direction than an outer circumferential surface of the partition wall main body portion 37*b*. An end section of this expansion portion on the stator core 14 side stands outward in the radial direction in a step manner with respect to the outer circumferential surface of the partition wall main body portion 37*b*. This standing end surface is in contact with an end surface on one end side in the axis direction of the stator core 14.

As shown in FIG. 2, the outer circumferential surface of the partition wall main body portion 37*b* of the annular partition wall 37 is maintained in a state of being in contact with the inner circumferential surface of the stator core 14. Further, the inner circumferential surface of the partition wall main body portion 37*b* of the annular partition wall 37 faces the outer circumferential surface of the rotor 11 with a small gap so as to be non-contact with the outer circumferential surface of the rotor 11.

Here, the foamable adhesion bond on the outer surface side foams by heating or the like, and thereby, the foamable insulation member 43 that is accommodated and arranged in each slot 31 of the stator core 14 together with the plurality of conductor wire portions 15*a* of the coil 15 is bonded to part of an inner wall of the slot 31. At this time, a portion of the foamable adhesion bond of the foamable insulation member 43 that is located at an inner end in the radial direction of the slot 31 enters the inside of the opening 40 at the inside in the radial direction of the slot 31 by the foaming and is bonded to the outer circumferential surface of the annular partition wall 37 through the opening 40. As a result, the circumferential wall main body portion 12*a* of the annular partition wall 37 is bonded and fixed to the foamable insulation member 43 at the inside of the plurality of slots 31 through the opening 40 of the slot 31.

Next, a specific manufacturing method (a method of fixing the annular partition wall 37 to the stator core 14) of the stator 10 is described.

Figure 3:
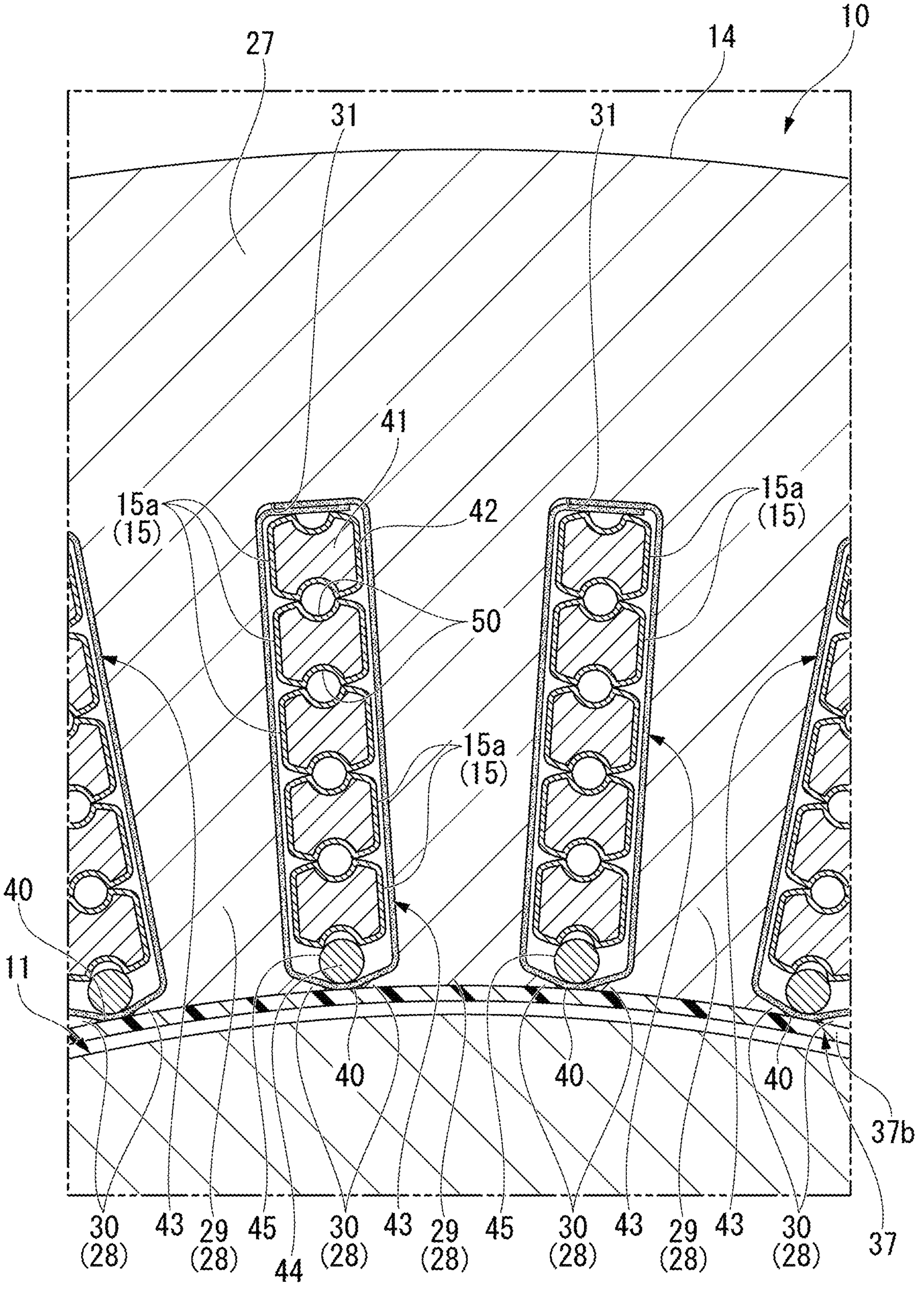
FIG. 3 is a cross-sectional view corresponding to FIG. 2 at the time of manufacturing of the rotary electric machine of the embodiment.
Figure 4:
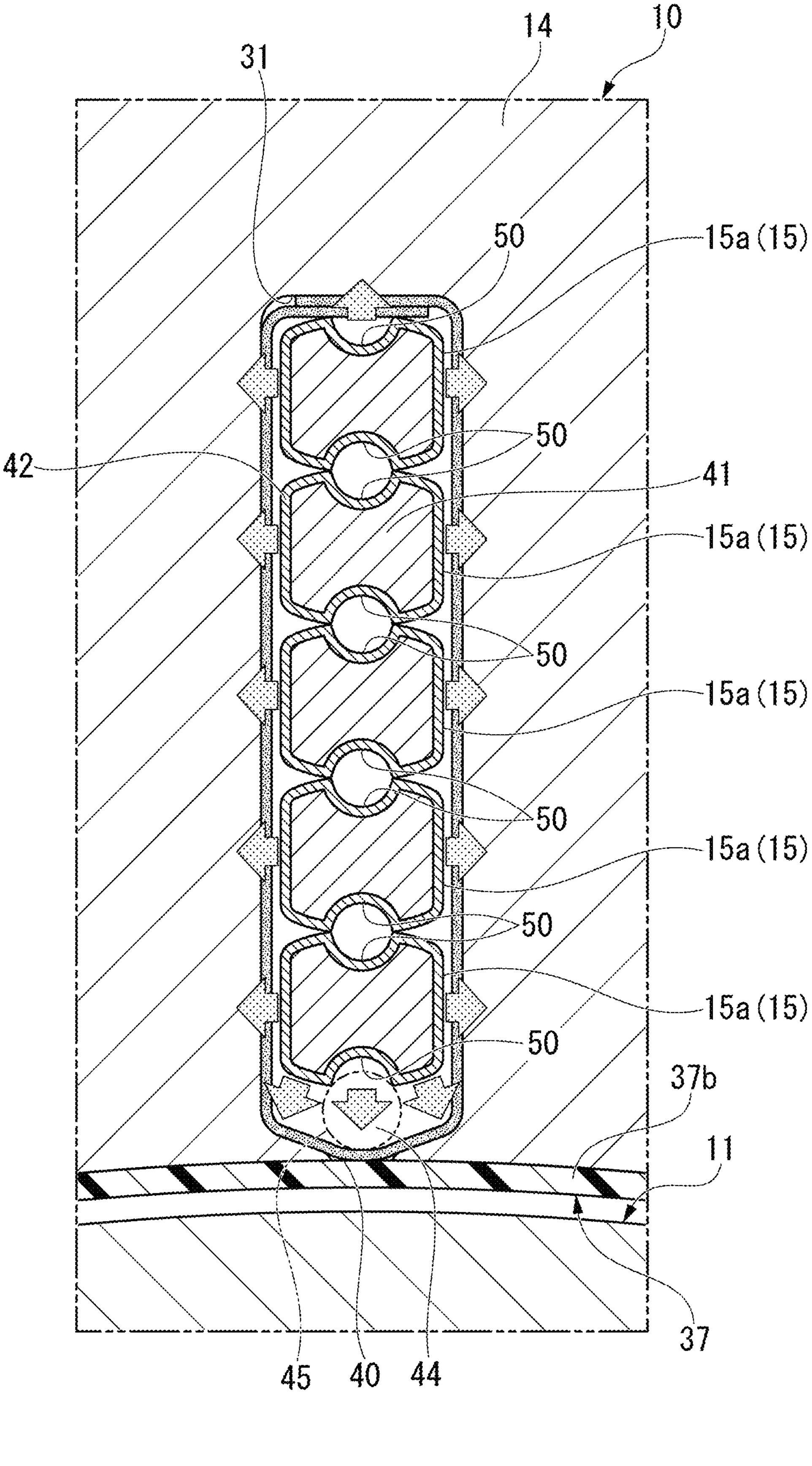
FIG. 4 is an enlarged cross-sectional view of part of FIG. 2 after manufacturing of the rotary electric machine of the embodiment.

FIG. 3 is a cross-sectional view similar to FIG. 2 at the time of one process of manufacturing. Further, FIG. 4 is an enlarged cross-sectional view of part of FIG. 2 after the manufacturing.

First, a bundle of the plurality of conductor wire portions 15*a* of the coil 15 having an outside that is covered by the foamable insulation member 43 is inserted into each corresponding slot 31 of the stator core 14, and the circumferential wall main body portion 12*a* of the annular partition wall 37 is inserted and arranged in an inner circumferential portion of the stator core 14.

When the outside of the plurality of conductor wire portions 15*a* is covered by the foamable insulation member 43, as shown in FIG. 3, a spacer member 45 having a rod shape is arranged at the inside in the radial direction of a conductor wire portion 15*a* among the plurality of conductor wire portions 15*a* that is located at an innermost side in the radial direction when being accommodated and arranged in the slot 31. A spacer member 45 having a rod shape and extending linearly along the conductor wire portion 15*a* (along the axis direction of the stator core 14) that is arranged in the slot 31 can be used. The outer surface of the spacer member 45 together with the plurality of conductor wire portions 15*a* is covered by the foamable insulation member 43 having a sheet shape. In the present embodiment, a spacer member 45 in which a circular cross section extends linearly along the axis direction is employed.

Next, in this state, the foamable insulation member 43 (foamable adhesion bond) in each slot 31 is caused to foam by heating or the like. When the foamable insulation member 43 (foamable adhesion bond) foams in the slot 31, the outer surface of the foamable insulation member 43 is bonded to part of the inner wall of the slot 31, and part of the foamable insulation member 43 enters the inside of the opening 40 of the slot 31 and is bonded to the outer circumferential surface of the annular partition wall 37 through the opening 40.

Then, after the foaming in the slot 31 of the foamable insulation member 43 (foamable adhesion bond) is completed, the spacer member 45 having a rod shape is pulled out in the axis direction from the foamable insulation member 43. As a result, at least a gap corresponding to the cross section of the spacer member 45 is formed between the foamable insulation member 43 and the conductor wire portion 15*a* at the innermost side in the radial direction, and the cooling liquid passage 44 having a sufficient cross-sectional area is ensured.

In the rotary electric machine 1 having the configuration described above, when a current continuously flows through the coil 15 at the time of operation, the coil 15 generates heat and becomes a high temperature.

At this time, the cooling liquid 23 is introduced into the first liquid room 21 of the rotary electric machine 1 through the introduction port 24 from the circulation circuit 25. The cooling liquid 23 that is introduced into the first liquid room 21 flows in the first liquid room 21 and thereby cools a region on one end portion side of the coil 15 that is exposed to the outside from the one end side in the axis direction of the stator core 14. Further, the cooling liquid 23 flows through the plurality of slots 31 (cooling liquid passage 44 in the slots 31) of the stator core 14 from one end side in the axis direction toward another end side and flows into the second liquid room 22. The cooling liquid that flows through the inside of the slot 31 cools the conductor wire portion 15*a* of the coil 15 that is inserted through the inside of the slot 31. Further, the cooling liquid 23 that flows into the second liquid room 22 cools a region on the other end portion side of the coil 15 that is exposed to the outside from the other end side in the axis direction of the stator core 14 and is then caused to return to the circulation circuit 25 through the discharge port 26.

In the rotary electric machine 1, the stator 10 is constantly immersed in the cooling liquid 23 in the rotary electric machine case 12 as described above, and in that state, the cooling liquid 23 in the rotary electric machine case 12 is replaced through the circulation circuit 25. Therefore, the coil 15 of the stator 10 is efficiently cooled by the cooling liquid 23.

As described above, in the stator 10 of the rotary electric machine 1 of the present embodiment, the foamable insulation member 43 that covers the outer surface of the plurality of the conductor wire portions 15*a* of the coil 15 and is bonded to the outer circumferential surface of the annular partition wall 37 (cover member) through the opening 40 of the slot 31 is loaded in each slot 31 of the stator core 14. Therefore, the annular partition wall 37 (cover member) is bonded through the opening 40 of each slot 31 to the foamable insulation member 43 in the plurality of slots 31.

Accordingly, when the stator 10 of the rotary electric machine 1 of the present embodiment is employed, a complicated machining for fixing the annular partition wall 37 (cover member) to the stator core 14 is not required, and it is possible to easily and strongly fix the annular partition wall 37 (cover member) to the inner circumferential portion of the stator core 14.

Further, in the stator 10 of the present embodiment, not only the annular partition wall 37 (cover member) is fixed by the foamable insulation member 43 in each slot 31, but also the circumferential region of the conductor wire portion 15*a* of the coil 15 can be reliably insulated by the foamable insulation member 43. When the stator 10 of the present embodiment is employed, unlike the case where the annular partition wall 37 (cover member) is fixed to the inner circumferential surface of the stator core 14 by a dedicated adhesion bond, the annular partition wall 37 (cover member) can be fixed to the inner circumferential surface of the stator core 14 simultaneously in an attachment step of the foamable insulation member 43 for insulating the circumferential region of the conductor wire portion 15*a* of the coil 15.

Accordingly, when the stator 10 of the rotary electric machine 1 of the present embodiment is employed, it is possible to facilitate the manufacturing of the stator 10.

Further, the stator 10 of the rotary electric machine 1 of the present embodiment employs the foamable insulation member 43 having an outer surface on which the foamable adhesion bond is arranged. Therefore, only by covering the outer surface of the plurality of conductor wire portions 15*a* of the coil 15 by the foamable insulation member 43, inserting the conductor wire portions 15*a* and the foamable insulation member 43 into a corresponding slot 31, and causing the foamable adhesion bond to foam, the annular partition wall 37 (cover member) can be easily and reliably fixed to the foamable insulation member 43 in the plurality of slots 31 by the foamable adhesion bond.

Further, in the stator 10 of the rotary electric machine 1 of the present embodiment, the inside of the plurality of slots 31 constitutes the cooling liquid passage 44 in which the cooling liquid 23 flows from one end side in the axis direction of the stator core 14 to another end side. Therefore, the conductor wire portion 15*a* of the coil 15 that is arranged to be inserted in the slot 31 can be efficiently cooled by the cooling liquid 23. Further, in the case of the present configuration, since the outflow of the cooling liquid 23 from the slot 31 to the outer circumferential surface of the rotor 11 can be blocked by the annular partition wall 37 (cover member), it is possible to eliminate the inconvenience in which the rotation of the rotor 11 is blocked by a large amount of the cooling liquid 23 flowing into the outer circumferential surface of the rotor 11.

Further, in the present configuration, the opening 40 of each slot 31 is closed by the foamable insulation member 43, and a portion of the outer circumferential surface of the partition wall main body portion 37*b* of the annular partition wall 37 on which the pressure of the cooling liquid 23 acts is reinforced by a bond portion of the foamable insulation member 43. Therefore, without increasing the thickness of the partition wall main body portion 37*b* of the annular partition wall 37, deformation of the partition wall main body portion 37*b* due to the pressure of the cooling liquid 23 can be prevented.

Accordingly, when the stator 10 of the present embodiment is employed, it is possible to thin the thickness of the annular partition wall 37, narrow a gap between the stator 10 and the rotor 11, and enhance a magnetic performance of the rotary electric machine 1.

Further, in the manufacturing method of the stator 10 of the present embodiment described above, the plurality of conductor wire portions 15*a* is inserted together with the foamable insulation member 43 into the slot 31 in a state where the outer surface of the plurality of conductor wire portions 15*a* of the coil 15 is covered by the foamable insulation member 43, and then the foamable insulation member 43 is bonded to the outer circumferential surface of the annular partition wall 37 (cover member) through the opening 40 of the slot 31 by causing the foamable insulation member 43 to foam. Therefore, only by covering the outer surface of the plurality of conductor wire portions 15*a* by the foamable insulation member 43, inserting the conductor wire portions 15*a* and the foamable insulation member 43 into a corresponding slot 31, and causing the foamable insulation member 43 to foam, the annular partition wall 37 (cover member) can be bonded and fixed to the foamable insulation member 43 in the plurality of slots 31 through the opening 40 of the slot 31.

Accordingly, when the manufacturing method of the stator 10 of the present embodiment is employed, a complicated machining for fixing the annular partition wall 37 (cover member) to the stator core 14 is not required, and it is possible to easily and strongly fix the annular partition wall 37 (cover member) to the inner circumferential portion of the stator core 14.

Further, in the manufacturing method of the stator 10 of the present embodiment, the spacer member 45 having a rod shape and extending substantially along the conductor wire portion 15*a* is arranged on the inside in the radial direction of the conductor wire portion 15*a* that is arranged at the innermost side in the radial direction in the slot 31, and the outer surface of the plurality of conductor wire portions 15*a* and the spacer member 45 are covered by the foamable insulation member 43. Then, the spacer member 45 and the plurality of conductor wire portions 15*a* are inserted together with the foamable insulation member 43 into the slot 31, and then the foamable insulation member 43 is bonded to the outer circumferential surface of the annular partition wall 37 through the opening 40 of the slot 31 by causing the foamable insulation member 43 to foam. Therefore, by covering the outer surface of the plurality of conductor wire portions 15*a* of the coil 15 and the spacer member 45 by the foamable insulation member 43 and causing the formable insulation member 43 to foam in a corresponding slot 31 in that state, it becomes possible to arrange the plurality of conductor wire portions 15*a* at an appropriate position on the outside in the radial direction of the slot 31. That is, the conductor wire portion 15*a* can be arranged to deviate to the outside in the radial direction in the slot 31 by the spacer member 45 that is arranged at the inside in the radial direction of the plurality of conductor wire portions 15*a*.

Then, when the conductor wire portion 15_a_ is arranged to deviate to the outside in the radial direction in the slot 31 in this way, the pressure of the cooling liquid 23 does not easily act on the end surface on the outside in the radial direction of the conductor wire portion 15_a_ at the outermost side in the radial direction in the slot 31. As a result, the plurality of conductor wire portions 15_a_ do not easily receive the pressure of the cooling liquid 23 and do not easily move inward in the radial direction, and it becomes possible to prevent the partition wall main body portion 37_b_ of the annular partition wall 37 from being deformed inward in the radial direction by the pressing by the conductor wire portion 15_a_.

Further, when a portion of the foamable insulation member 43 that is located at the inside in the radial direction of the slot 31 foams, an inner surface side (a side away from the opening 40 of the slot 31) of the foamable insulation member 43 is supported by the spacer member 45. Therefore, at the time of foaming of the foamable insulation member 43, an inner portion of the foamable insulation member 43 is favorably displaced toward the opening 40 of the slot 31 in a state where the inner surface side is supported by the spacer member 45. Accordingly, when the manufacturing method of the stator 10 of the present embodiment is employed, part of the foamable insulation member 43 reliably passes through the opening 40 of the slot 31 at the time of foaming and is reliably bonded to the partition wall main body portion 37_b_ of the annular partition wall 37 through the opening 40. Therefore, part of the foamable insulation member 43 can be reliably bonded to the outer circumferential surface of the annular partition wall 37 (cover member) through the opening 40.

Specifically, in the present embodiment, since a spacer member 45 having a shape in which a circular cross section continues in the axis direction is employed, a foaming reaction force of the foamable insulation member 43 can be efficiently supported by a top portion of the circular cross section of the spacer member 45 when part of the foamable insulation member 43 foams and enters the inside of the opening 40. Accordingly, by employing the present configuration, part of the foamable insulation member 43 can be further reliably bonded to the outer circumferential surface of the annular partition wall 37 (cover member) through the opening 40.

Further, in the manufacturing method of the stator 10 of the present embodiment, the spacer member 45 is extracted from the inside of the foamable insulation member 43 after bonding the foamable insulation member 43 to the outer circumferential surface of the partition wall main body portion 37_b_ of the annular partition wall 37 through the opening 40 of the slot 31 by causing the foamable insulation member 43 to foam. In the case of the manufacturing method of the present embodiment, by extracting the spacer member 45 having a rod shape after causing the foamable insulation member 43 to foam, it is possible to reduce the weight of the stator 10.

Further, in the manufacturing method of the present embodiment, since the spacer member 45 having a rod shape is extracted after causing the foamable insulation member 43 to foam, a communication hole along the axis direction of the stator 10 is formed at a portion where the spacer member 45 has been present at the inside of the foamable insulation member 43. Accordingly, when the stator 10 is manufactured in this way, by using the communication hole portion that is formed at the inside of the foamable insulation member 43 as the cooling liquid passage 44, it becomes possible to efficiently cool the conductor wire portion 15_a_ of the coil 15.

The present invention is not limited to the embodiment described above, and various design changes can be made without departing from the scope of the invention. For example, in the embodiment described above, the annular partition wall 37 that partitions the inner circumferential surface of the stator core 14 and the outer circumferential surface of the rotor 11 is arranged as the cover member on the inner circumferential portion of the stator core 14. However, the cover member is not limited to the annular partition wall 37 that partitions the inner circumferential surface of the stator core 14 and the outer circumferential surface of the rotor 11 and may be a member that has a cylindrical shape and does not partition the stator core 14 and the rotor 11 in a liquid-tight manner.

Further, in the embodiment described above, the foamable adhesion bond is arranged on the outer surface of the foamable insulation member 43; however, the foamable insulation member 43 is not necessarily limited to this structure. Without arranging the foamable adhesion bond on the outer surface of the foamable insulation member 43, after a portion of the foamable insulation member 43 enters the opening 40 of the slot 31 by a foaming process, the portion of the foamable insulation member 43 that is exposed to the outside through the opening 40 may be bonded to the outer surface of the annular partition wall 37 (cover member) separately by an adhesion bond.

Further, in the embodiment described above, the slot 31 of the stator core 14 constitutes the cooling liquid passage 44 that causes the cooling liquid 23 in the first liquid chamber 21 to flow to the second liquid chamber 22 side; however, the stator may have a configuration that does not cause the cooling liquid 23 to flow through the slot 31.

What is claimed is:

1. A rotary electric machine stator manufacturing method which is a manufacturing method of a rotary electric machine stator that comprises:

a stator core having an annular shape and including a plurality of teeth portions that are aligned in a circumferential direction and a plurality of slots that are formed between the teeth portions which are adjacent to each other in the circumferential direction;

a coil in which a plurality of conductor wire portions are wound around each of the teeth portions through the slots; and a cover member that has a cylindrical shape and is arranged to be inserted into an inner circumferential portion of the stator core such that an outer circumferential surface faces an opening on an inside in a radial direction of the plurality of slots, the rotary electric machine stator manufacturing method comprising:

inserting, in a state where an outer surface of the plurality of conductor wire portions of the coil is covered by a foamable insulation member, the plurality of conductor wire portions together with the foamable insulation member into a slot among the plurality of slots; and then bonding the foamable insulation member to the outer circumferential surface of the cover member through the opening of the slot by causing the foamable insulation member to foam.

2. The rotary electric machine stator manufacturing method according to claim 1, comprising:

arranging, on an inside in the radial direction of a conductor wire portion among the plurality of conductor wire portions that is arranged at an innermost side in the radial direction in the slot, a spacer member having a rod shape and extending substantially along the conductor wire portion;

covering an outer surface of the plurality of conductor wire portions and the spacer member by the foamable insulation member;

inserting the spacer member and the plurality of conductor wire portions together with the foamable insulation member into the slot; and then bonding the foamable insulation member to the outer circumferential surface of the cover member through the opening of the slot by causing the foamable insulation member to foam.

3. The rotary electric machine stator manufacturing method according to claim 2, comprising:

extracting the spacer member from an inside of the foamable insulation member after bonding the foamable insulation member to the outer circumferential surface of the cover member through the opening of the slot by causing the foamable insulation member to foam.

* * * * *